United States Patent [19]

Wilhelm et al.

[11] Patent Number: 5,055,273
[45] Date of Patent: Oct. 8, 1991

[54] APPARATUS FOR PROCESSING HIGH VISCOSITY MATERIALS

[75] Inventors: Fritz Wilhelm, Karben; Heinz-Günter Witt, Offenbach am Main; Ludwig Hölting, Bruchköbel, all of Fed. Rep. of Germany

[73] Assignee: Davy McKee Aktiengesellschaft, Frankfurt, Fed. Rep. of Germany

[21] Appl. No.: 278,567

[22] Filed: Dec. 1, 1988

[30] Foreign Application Priority Data

Dec. 18, 1987 [DE] Fed. Rep. of Germany ....... 3743051

[51] Int. Cl.$^5$ ................................................ B01F 7/04
[52] U.S. Cl. ..................................... 422/135; 422/138; 422/228; 366/147; 366/312
[58] Field of Search ............... 422/135, 137, 138, 225, 422/226, 228, 229; 366/147, 302, 303, 309, 312, 313; 159/6.2, 6.3, 11.3, 25.1

[56] References Cited

U.S. PATENT DOCUMENTS

| | | | |
|---|---|---|---|
| 3,250,321 | 5/1966 | Root, III | 366/313 |
| 3,563,710 | 2/1971 | Dew, Jr. et al. | 366/147 |
| 3,630,688 | 12/1971 | Takiguchi et al. | 159/11.3 |
| 4,233,676 | 11/1980 | Lücke et al. | 366/147 |
| 4,274,751 | 6/1981 | Rector et al. | 366/313 |
| 4,600,313 | 11/1984 | Moroo et al. | 366/313 |
| 4,769,427 | 9/1988 | Nowakowsky et al. | 422/137 |
| 4,775,243 | 10/1988 | Baumgärtner | 366/303 |
| 4,826,324 | 5/1989 | Kunz et al. | 366/309 |

FOREIGN PATENT DOCUMENTS

| | | |
|---|---|---|
| 105436 | 4/1984 | European Pat. Off. . |
| 350689 | 6/1931 | United Kingdom . |
| 793457 | 4/1958 | United Kingdom . |
| 1025893 | 4/1966 | United Kingdom . |

Primary Examiner—Robert J. Warden
Assistant Examiner—D. John Griffith, Jr.
Attorney, Agent, or Firm—Allegretti & Witcoff, Ltd.

[57] ABSTRACT

An apparatus for processing high viscosity materials consisting of a heatable, horizontal vessel with a product inlet on the one end and a product outlet on the other end and, parallel to the axis of the vessel, a heatable rotating hollow shaft, supporting a plurality of heatable stirrer elements, and between these stirrer elements, fixed to the wall of the vessel, stationary baffle and scraping elements of different configurations.

Each stirrer element comprises one to four stirrer wings, each with two hollow spokes and a peripheral, hollow ring-segment connecting the spokes, and fixed to the peripheral end of these ring-segment connections trailing product dragging blades.

22 Claims, 6 Drawing Sheets

APPARATUS FOR PROCESSING HIGH VISCOSITY MATERIALS

BACKGROUND OF THE INVENTION

The present invention is concerning an apparatus for processing of high viscosity materials, comprising a heatable, horizontal vessel with baffle elements and scraping elements, and, supported on a rotating hollow shaft, a plurality of heatable stirrer elements. In particular, the invention is referring to an apparatus for the production, from preformed condensates, of polycondensates, through melt-phase polycondensation, at elevated temperature and under vacuum. The apparatus also can be used in the chemical treatment of polymer melts, for example, the conversion of end groups with modifying agents.

THE PRIOR ART

For the polycondensation of polyalkyleneterephthalates, there are generally used reactors, such as described, for example, in U.S. Pat. No. 3,617,225. In the use of such discs-ring-reactors for the production of particularly viscous polycondensates, which generally degrade under crosslinking, difficulties arise because these viscous materials do not drop readily enough from the upper container wall, the discs-rings and the shaft. Particularly critical is the wall area at the border between the melt and the vapor phase, on which, a polymer residue builds up which can be removed occasionally by a slightly rising melt level. One part of the product thus remains longer or completely in the reactor, which leads to reduced product quality through discoloration and/or crosslinking.

The device in accordance with the U.S. Pat. 3,976,431, with traversing wiping means does afford a better cleaning of the container wall, but leads to a still more intensive polymer build-up on the shaft and on the discs-rings, particularly because of the omission of the partition walls. Devices such as those described in U.S. Pat. No. 3,880,407 are suited for the mixing of additives, such as master batches, into polymer melts. For a treatment of highly viscous substances during which volatile components are released, such equipment is ill-suited.

For such reactions, particularly polycondensations, a high ratio of continuously renewed, free product surface to product volume is essential. At the same time the energy input should be as low as possible in order to limitate the temperature rise and to avoid undesirable side reactions, such as crosslinking and/or degradation. In contrast to this, the shape and the arrangement of the stirring discs and the counter blades in accordance with U.S. Pat. No. 3,880,407 are designed for maximum kneading effect, that means, for maximum energy input and low dispersion of the product sump. Measures to increase the free product surface by formation of polymer films are not disclosed. The axially extending stirring blades with scraping effect, permit only a slight dispersion of the product on the wall without being able to prevent occasional, quality-impairing incrustations.

THE INVENTION

It is the object of the present invention to design an apparatus for processing of high viscosity materials in such manner that the disadvantages stated above are obviated or at least minimized.

The apparatus is particularly suitable for a continuous melt polycondensation with initial melt viscosities of approximately 1 to 100 Pas, and final melt viscosities of approximately 100 to 10,000 Pas. Preferred operating conditions are temperatures of 250° to 320° C., exceptionally up to 370° C., as well as high vacuum. The product residence time, depending on the final melt viscosity desired, ranges from 0.5 to 5 hours, preferably from 0.75 to 3 hours. The rotation speed of the shaft is dependent on the viscosity and residence time, and must be empirically determined from case to case. Rotation speeds in the range of approximately 1.0 to 30 RPM, preferably 3 to 10 RPM, have proven suitable. With increasing rotation speeds above 10 RPM, for high product viscosity, the shearing power increases to such an extent, that the temperature rise in the product is high and the temperature control by external cooling of the walls becomes more and more difficult.

The apparatus may also be operated on a batch basis, in which case the product discharge is located at the bottom in the center of the vessel. Also, the vessel can get the shape of a truncated cone or of a cylinder with truncated cones at both ends.

THE DRAWINGS

The invention will be further illustrated by means of the drawings in which.

DETAILED DESCRIPTION

Figure 1:
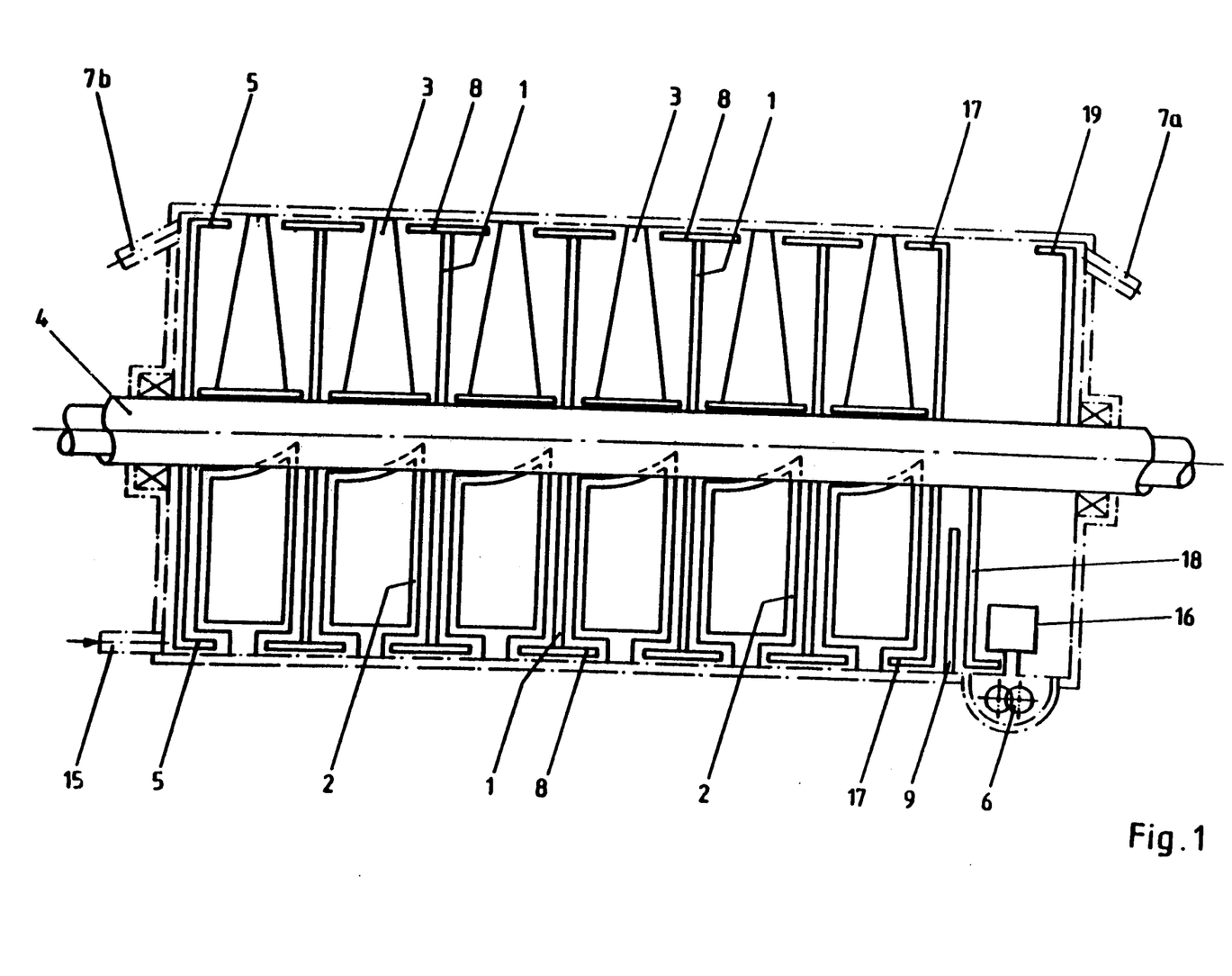
FIG. 1 is a longitudinal cross section through one embodiment of the apparatus in accordance with the invention.

FIG. 1 depicts, in a schematic representation, a longitudinal cross-section of the device in accordance with the invention comprising a cylindrical vessel with a central hollow shaft 4 with mechanical seals and external bearings at both ends of the vessel. One shaft-bearing can also be inside the vessel, lubricated with product.

The apparatus begins with the product inlet 15 at the front side of the vessel. At the opposite end of the device is a product discharge outlet comprising a self-cleaning double screw-pump 6, supplied with product at the bottom of the sump zone and the product outlet being located before the baffle grid 16 at an elevated position in the rotating direction of the stirrer elements 18 and 19 near the back wall of the vessel.

Corresponding heatable stirrer elements 5 and 17 are also disposed near the vessel front wall and before the weir wall 9 for the prevention of stagnating and harmful product zones at both vessel ends. Volatile vapors are removed through nozzles 7a and 7b at the outlet and inlet ends respectively.

The main processing zone of the cylindrical vessel is defined by the area located between the inlet and outlet, with a plurality of heated stirrer elements 1 connected in series to shaft 4 and with scraping elements 2 and baffle elements 3 between any neighboring stirrer elements 1.

Figure 2:
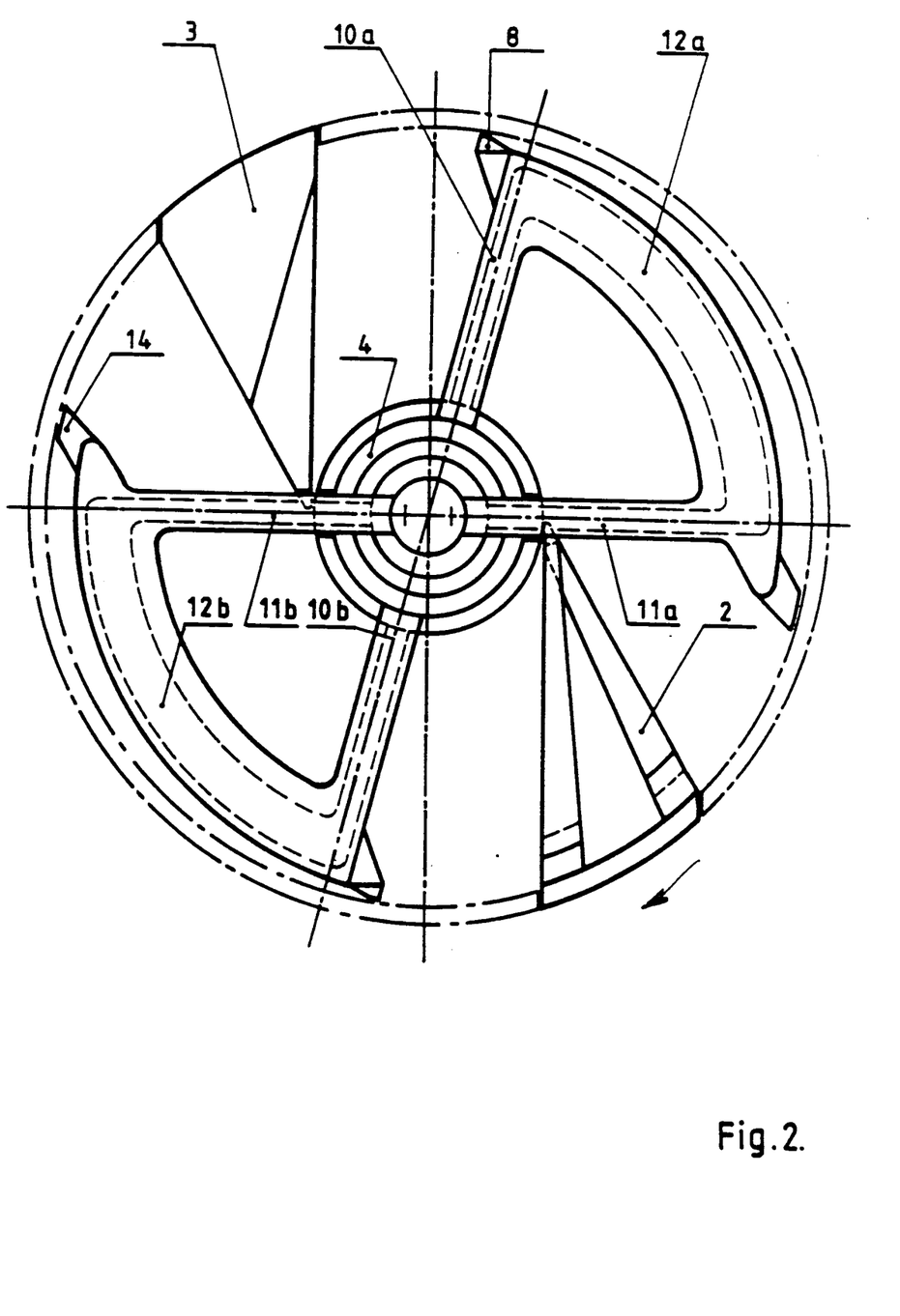
FIG. 2 is an axial view of a two-winged stirrer element.

The stirrer elements 1 shown in detail in FIG. 2, may be aligned in the axial direction along the shaft with respect to the position of the spokes connected to the shaft, or show an angular offset from one element to the next by up to 50%, preferably by up to 5%, of the angle between the spokes of the wing.

Radially-projecting baffle elements 3, fixed on the upper part of the circumferential vessel wall between the stirrer elements 1, are shaped like a truncated cone when viewed from the side (FIG. 1), and enlarged at the end near the shaft like a "T". As shown in FIG. 2, this top of the baffle element 3 is, due to its angle of incidence in accordance with the invention, relative to the radial reference direction, earlier in contact with the stirrer than the baffle base. Through this, the polymer product is displaced radially outward preventing a premature flowing of the product to the center of the vessel, which is undesirable in view of complete dispersion of the product on the wall and self-cleaning of the wall. The product accumulated by the stationary baffle elements 3 is subjected to a shearing action by the stirrer elements 1 and drawn in circumferential direction to expose a new surface. This forced renewal of the product surface is very significant for the accelerated evaporation of volatile components, like gaseous fission products of polycondensations. The transport of the product inside the vessel and the regular dispersion of the product on the wall are provided by the trailing product dragging blades 8, fixed on the circumferential side of the stirrer elements, possibly assisted by a shaft eccentricity which, on the wall opposed to the sump area, allows an additional product distribution and more intensive product exchange at the reactor wall.

The stationary scraping elements 2 projecting upwardly from the lower vessel area are designed as frames adjacent the stirrer bodies including the shaft, which, before the stirrer elements dip again into the product sump, subject the product layers adhering to the shaft, the side surfaces of the stirrer elements and the internal surfaces of the product dragging blades 8 again to shearing and film formation. They serve to clean the stirrer elements. Individual scraping and baffle elements can wear a bore in the area close to the wall in order to hold measuring instruments, for example temperature sensors.

FIG. 2 shows the scraping element 2 in more detail. The side pieces of the frame projecting inward are angularly offset from the radial direction and in the axial view each scraping element has a triangular shape.

Due to this angular offset from the radial direction, again, the inside located scraper parts are in an earlier contact with the stirrer than the base parts, thus causing the product to be moved in the outside direction. The frame connection near to the shaft may be parallel to the axis of the vessel or, as shown in FIG. 2, helically-inclined in order to attain an axial transport of the product.

The stirrer element is, in this preferred embodiment, depicted with two stirrer wings 12a or 12b. The stirrer wings comprise a pair of hollow spokes 10a or 11a and 10b or 11b, connected at their outer ends to hollow peripheral ring-segments 12a or 12b. The radial width of the hollow ring segments may be constant over the entire length of the apparatus or may decrease in width from the product inlet end to the product outlet end. For heating, the hollow elements are arising from separate channels within the hollow shaft 4.

The ring-segments have at the trailing edge a short prolongation, to which the product dragging blades 8 are attached.

This location of the dragging blades at the back side of the stirrer wings, according to the invention, serves to interrupt the film formation at the baffle elements 3, and to provide a certain free cross-section inside the apparatus for the continuous axial removal of the vapors.

If required, additional thin scraper elements 14 can be mounted more close to the wall at the second prolongation of the ring-segments at the leading edge of the stirrer wings.

FIG. 2 is an example of the preferred two-winged stirrer element. Stirrer elements with one, three or four heated stirrer wings can be used as well. One particular advantage of the one-wing and two-wings arrangement is an easy disassembling of the complete apparatus. Three-winged and four-winged stirrer elements have technical process advantages, such as an increased product level stability and due to a better approach of plug-flow conditions, a more uniform product residence time. However dismounting of the reactor is difficult. With two-winged stirrer elements, the spokes 10 and 11 of each stirrer wing form an angle of 50 to 100 degrees, preferably of about 75 degrees, and with a three-winged element an angle of 40 to 80 degrees, preferably of 50 to 60 degrees.

Figure 3:
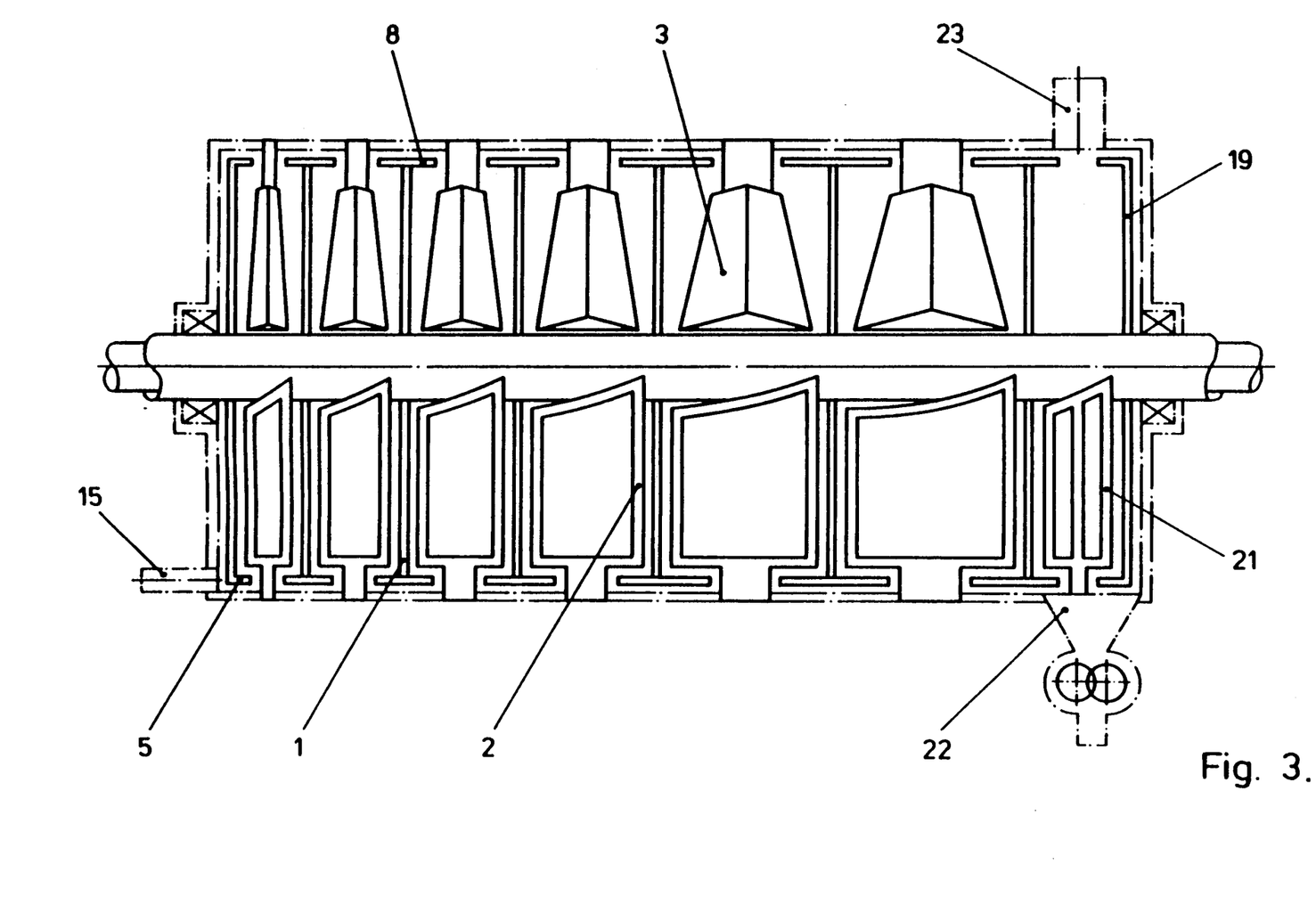
FIG. 3 is a view similar to FIG. 1 of an other embodiment of the apparatus of the invention in which the distance from one element to the next progressively increases from the inlet to the outlet end of the cylindrical vessel.

FIG. 3 illustrates one particularly preferred embodiment of the apparatus in accordance with the invention, with the axial distance of the stirring-, baffle-, and scraping-elements, increasing from the inlet to the outlet ends. Vapors are withdrawn in the upper part through the opening 23

The product discharge outlet 22 is placed at a higher position, in the direction of rotation elevated by 20 to 80 degrees from the bottom of the vessel. (Due to the stirring motion and the high viscosity, the product sump does not remain at the bottom of the vessel, but is entrained in a higher position corresponding to this angular area.)

A combined, frame-like baffle- and scraping-element 21, with an additional central bar, is located after the outlet 22 at an elevated position accordingly.

Figure 4A:
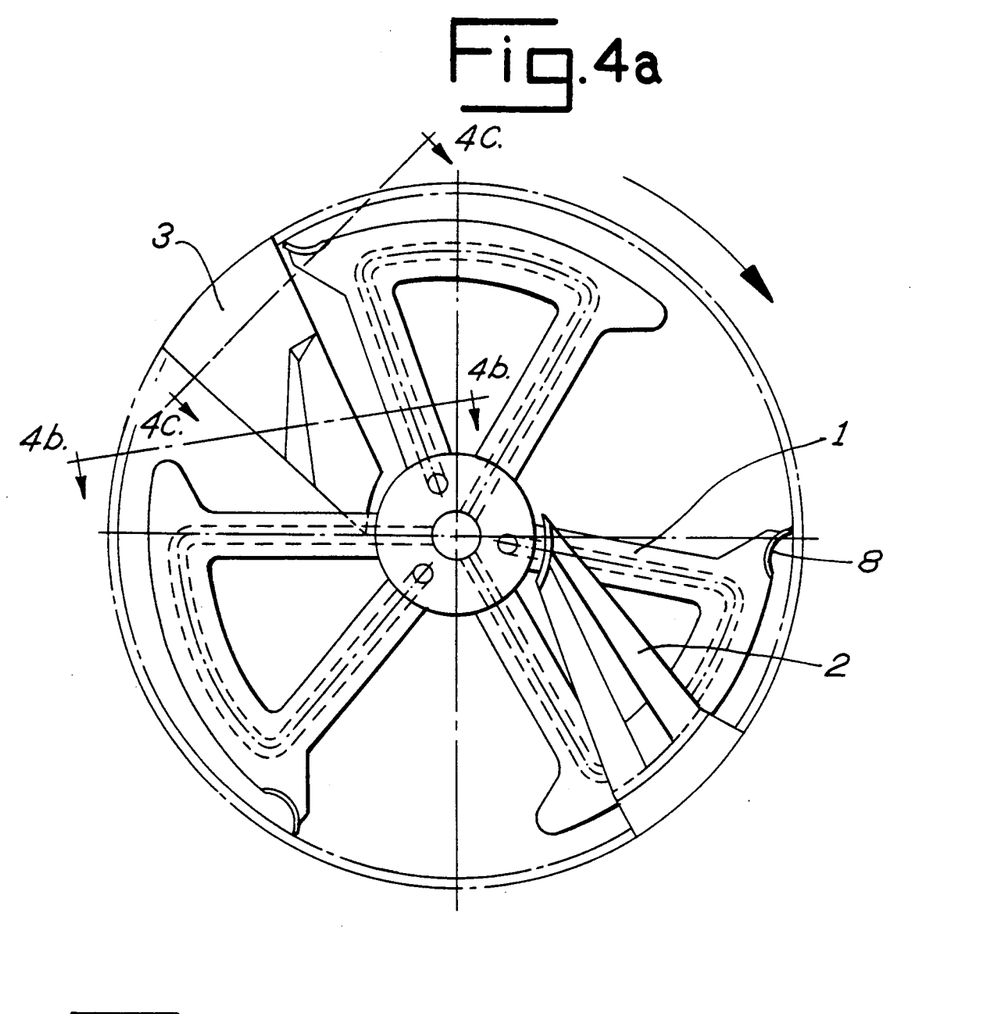
FIG. 4 is a view similar to FIG. 2 showing baffle elements and scraping elements in the modification of FIG. 3 for a three-winged stirrer element.
Figure 4B:
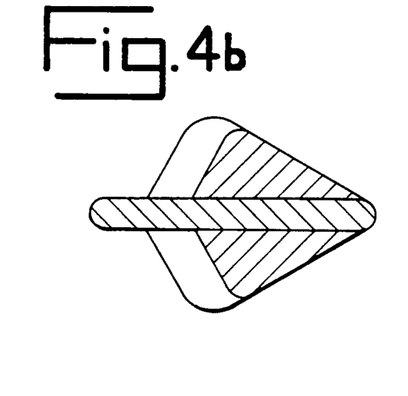
Figure 4C:
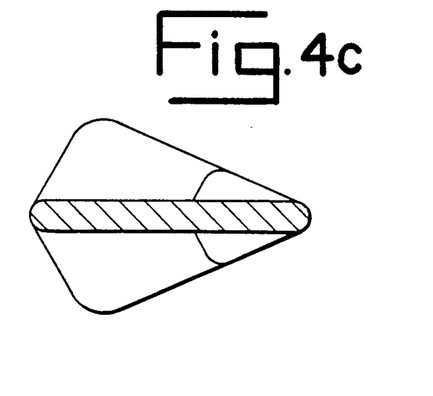

The baffle elements 3, in the side view, have the external contour of a truncated cone. As depicted in FIG. 4, particularly in the sections A-B and C-D, the baffle elements 3 have a rhomboid-like cross-section with an obtuse front edge and an elongated rear side. The radial height of the truncated cone is conforming to the internal radius of the ring-segment of the stirrer wings. The scraping elements 2 depicted in FIG. 4 have a compact support bracket of the upper frame, which provides an increased mechanical stability.

In the three-winged stirrer assembly the corresponding stirrer spokes axially following one after another are offset by angles up to 25%, preferably by up to 2.5% of the angle between the spokes of the wing. If the stirrer wings are aligned in the axial direction, the baffle and scraping elements axially following one after another are offset along the vessel wall by a radial angle of 0.5 to 5 degrees, preferably 1.0 to 2.5 degrees.

Figure 5:
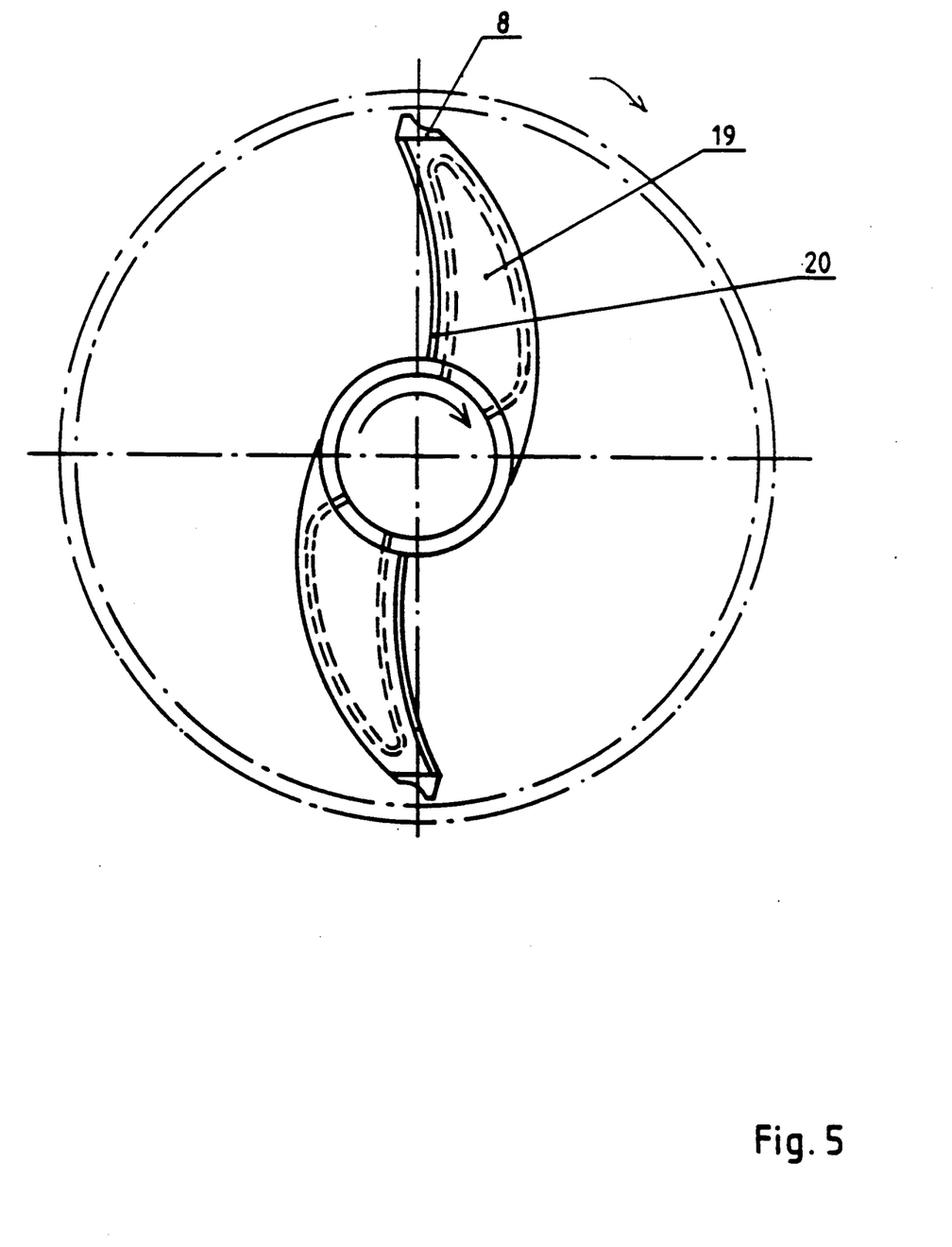
FIG. 5 is an axial view of two-winged stirrer element located adjacent to the wall of the cylindrical vessel at the outlet side.

The preferred design of the last stirrer element 19 on the discharge end is illustrated in FIG. 5, as a view from the back side, in the case of the two-winged stirrer type.

The compact, heatable stirrer arms have a shape similar to a banana being bent backwardly and equipped with trailing product dragging blades 20 contacting the rear end wall as well as dragging blades 8 contacting the peripheral wall of the vessel. Through these compact, banana-shaped stirring arms, a controlled sump level is attained in the product discharge area, and, as a result of the uninterrupted product dragging blades 20, which go over at their peripheral end continuously into the trailing edge of the dragging blades 8 fixed on one side, a systematic product transport from the shaft area to the periphery, and consequently, a steady exchange of product assuring a cleaning effect in the discharge area, is achieved.

Figure 6:
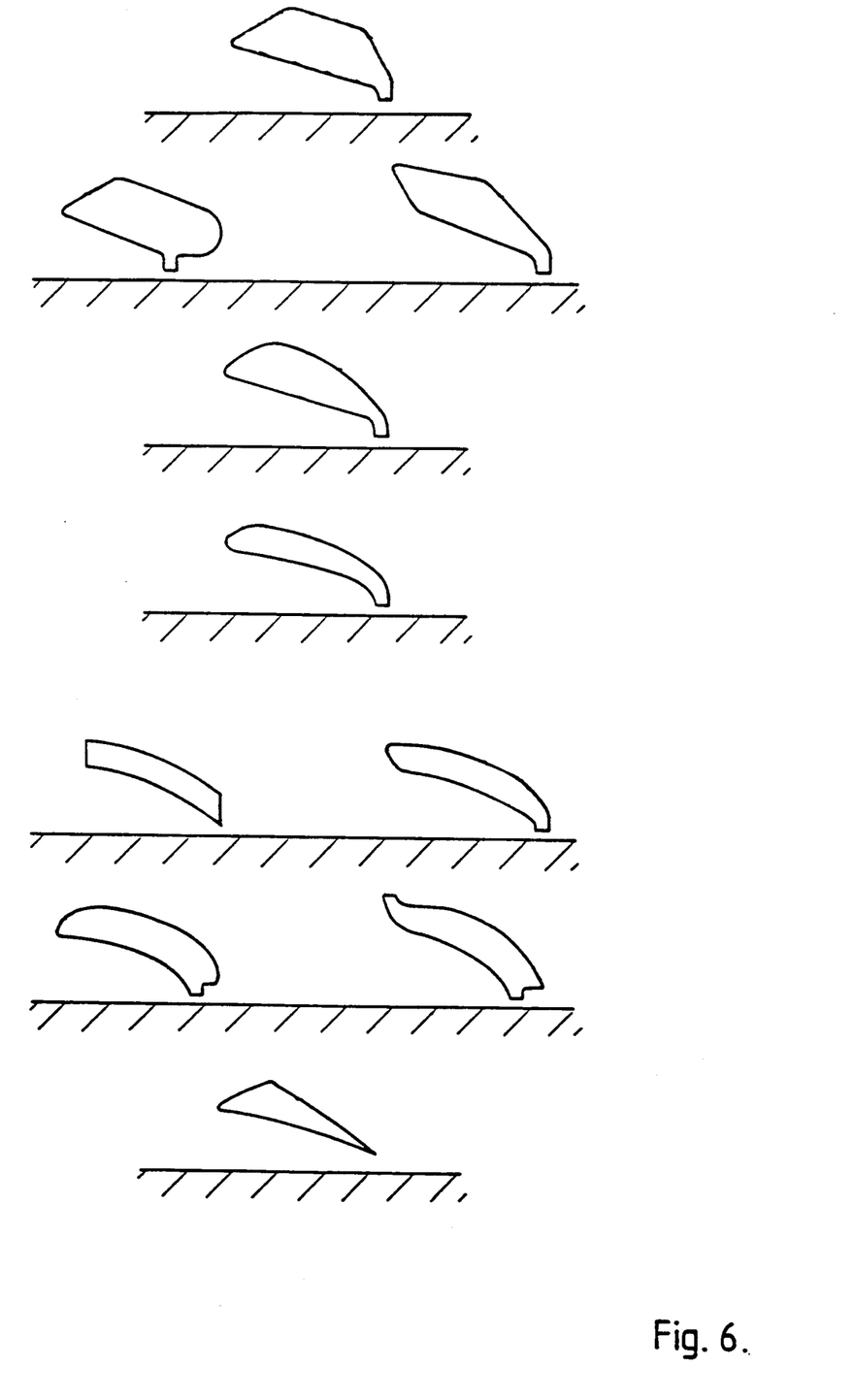
FIG. 6 is a schematic side view of various geometric shapes for the product dragging blades useful in the invention.

Possible alternative geometric shapes for the product dragging blades 8 are shown schematically in FIG. 6. Such dragging blades, according to the invention, contain a ladle space, open on both sides, and tapered against the direction of rotation, e.g. wedge-shaped or convex, with a comparatively thin trailing edge very close to the peripheral walls of the vessel. By this means, it is ensured that, on the one hand, a controlled quantity of product is regularly conveyed to the wall and exchanged, and that, on the other hand, due to minimal shearing surfaces, the generation of frictional heat is limited. A further reduction of friction energy at the wall surface may be effected by using a comb-like or wave-shaped trailing edge.

We claim:

1. In an apparatus for processing of high viscosity materials, comprising a heatable, substantially horizontal elongated vessel with circular cross section and a product inlet at one end and a product outlet on the other end, and parallel to the axis of the vessel a heatable, rotating hollow shaft with a plurality of stirrer elements axially-spaced on the shaft, and stationary baffle and scraping elements projecting inwards from the vessel wall, between said stirrer elements, the improvement comprising
    a) each of said stirrer elements consisting of one to four stirrer wings, each with two hollow spokes and a peripheral hollow ring-segment connecting the outer ends of these two spokes, said ring segment having a trailing end, a product dragging blade at the trailing end of each of said ring-segments, and with means for circulating a heat transfer medium through the shaft, the hollow spokes and the hollow ring-segment connections,
    b) the stirrer element at said inlet end and the last stirrer element at said outlet end having a shape matching these vessel ends,
    c) each of said scraping elements consisting of a frame, adjacent said stirrer elements, having a support bracket projecting from the inner wall of the vessel, two side pieces angularly offset from the radial direction with respect to the axis of the vessel, said scraping elements having a substantially triangular shape when viewed along the axis of the vessel, and a transverse connector joining said two side pieces adjacent the shaft, said scraper elements being disposed between adjacent stirrer elements, except between the two stirrer elements nearest said outlet end,
    d) each of said baffle elements having, in side view, the shape of a truncated cone, having an enlarged surface adjacent the shaft, and being angularly offset from the radial direction with respect to the axis of the vessel, said enlarged cone surface being adjacent said shaft, said baffle elements being disposed between adjacent stirrer elements, except between the two stirrer elements nearest said outlet end.

2. The apparatus of claim 1, wherein the distances between said stirrer elements from one to the next, as well as between said baffle and scraping elements, are constant in the axial direction.

3. The apparatus of claim 1, wherein the distances between said stirrer elements, from one to the next, as well as between the baffle and scraping elements, progressively increase from said product inlet end to said product outlet end.

4. The apparatus of claim 1, wherein the radial width of said hollow ring segments is constant over the entire length of the apparatus.

5. The apparatus of claim 1, wherein the radial width of said hollow ring segments decreases from the product inlet end to the product outlet end.

6. The apparatus of claim 1, wherein said ring segments are positioned concentrically to the shaft axis and are spaced from the wall of the vessel at a distance equal to less than 10% of the diameter of the vessel.

7. The apparatus of claim 1, wherein said ring segments are positioned helically, relative to the shaft axis, and are spaced from the container wall of the vessel at a distance equal to less than 10% of the diameter of the vessel.

8. The apparatus of claim 1, wherein said baffle and scraping elements axially following one another are positioned on the wall of the vessel on helical lines, and said stirrer wings of successive stirrer elements are aligned in the axial direction.

9. The apparatus of claim 1, wherein said baffle and scraping elements axially following one another are axially aligned, and said stirrer wings of successive stirrer elements are angularly offset in the axial direction.

10. The apparatus of claim 1, wherein each stirrer element consists of two stirrer wings, the spokes of which form an angle between 50 and 100 degrees, and wherein said stirrer wings are offset from one element to the next by 0 to 50% of this angle.

11. The apparatus of claim 10, wherein said spokes form an angle of approximately 75 degrees, and said stirrer wings are offset by 0 to 5% of this angle.

12. The apparatus of claim 1, wherein each stirrer element consists of three stirrer wings, the spokes of which form an angle of 40 to 80 degrees, and wherein said stirrer wings are offset from one element to the next by 0 to 25% of this angle.

13. The apparatus of claim 12, wherein said spokes form an angle of 50 to 60 degrees, and said stirrer wings are offset by 0 to 2.5% of this angle.

14. The apparatus of claim 12, wherein said stirrer wings are offset by 0%, and said baffle and scraping elements axially following one another are offset on the wall of the vessel, from one to the next, by a radial angle in the range of 0.5 to 5 degrees.

15. The apparatus of claim 1, wherein one scraping element and one baffle element are present between each of two adjacent stirrer elements.

16. The apparatus of claim 1, wherein the vessel has an end wall at said outlet end, and the stirrer element adjacent said outlet end has at least one heatable, arcuate stirrer arm bent backwards from the direction of rotation, a trailing product-dragging blade in contact with said end wall and a peripheral trailing product-dragging blade in contact with the circumferential wall of the vessel.

17. The apparatus of claim 1 or 16, wherein said peripheral product dragging blades in contact with said circumferential wall form, in the direction of rotation and on both sides open ladle spaces, tapered against the direction of rotation, the trailing edges of said dragging blades having alternatively a flat, a comb-shaped or a wave-shaped profile.

18. The apparatus of claim 1, wherein said product outlet is angularly disposed away from the bottom of the vessel 10 to 80 degrees above the bottom center line in the direction of rotation, and wherein a combined, frame-shaped baffle and scraping element with an additional middle bar projects from the vessel wall, said baffle and scraping element being disposed directly behind said outlet in the direction of rotation, between said two stirrer elements nearest said outlet end.

19. The apparatus of claim 18, wherein said combined baffle and scraping element has a grid structure.

20. The apparatus of claim 1, wherein the axis of said shaft is eccentric to the vessel axis in the vessel upper quadrant following a vertical center line of the vessel in the direction of rotation.

21. The apparatus of claim 1, wherein the axis of the vessel forms an angle to the horizontal in the range of 0 to 20 degrees.

22. The apparatus of claim 1 in which a single combined baffle and scraping element is disposed between said two stirring elements nearest said outlet end.

* * * * *